No. 780,288. PATENTED JAN. 17, 1905.
L. A. HASSEMER & L. H. MENDELL.
COMBINED CANOPY AND PARASOL COVER FOR BABY CARRIAGES.
APPLICATION FILED JUNE 4, 1904.
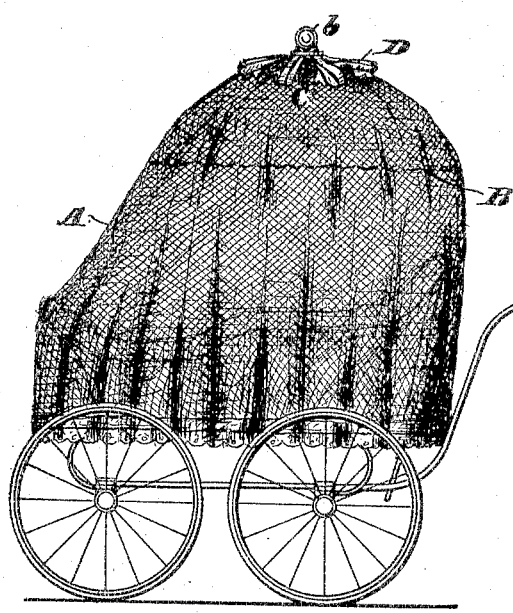
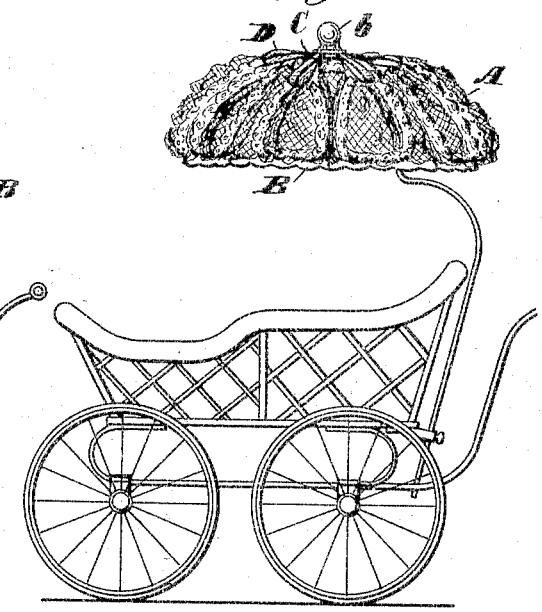
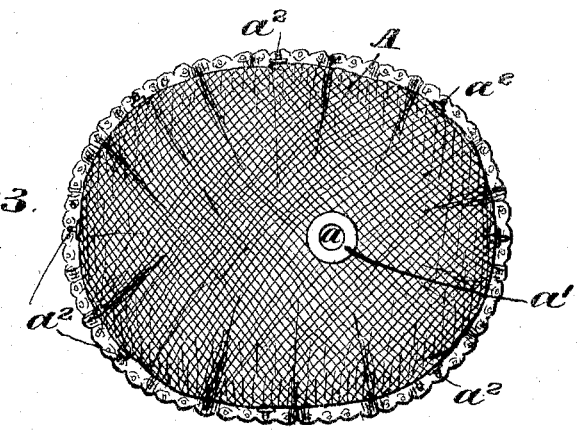
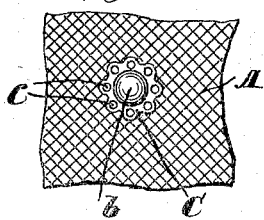
Witnesses
Geo H Botts
Mabelle F. Lake
Inventors
Lucy A. Hassemer and Lillian H. Mendell
By their Attorney
Edith J. Griswold No. 780,288. Patented January 17, 1905.

UNITED STATES PATENT OFFICE.

LUCY A. HASSEMER AND LILLIAN H. MENDELL, OF NEW YORK, N. Y.

COMBINED CANOPY AND PARASOL-COVER FOR BABY-CARRIAGES.

SPECIFICATION forming part of Letters Patent No. 780,288, dated January 17, 1905.

Application filed June 4, 1904. Serial No. 211,162.

*To all whom it may concern:*

Be it known that we, LUCY A. HASSEMER and LILLIAN H. MENDELL, citizens of the United States, and residents of New York city, county and State of New York, have invented a Combined Canopy and Parasol-Cover for Baby-Carriages, of which the following is a specification.

Our invention relates to an article adapted to serve as a canopy for protecting a child in a baby-carriage from flies or mosquitoes or other flying insects and also to serve as an ornamental parasol-cover when not in use as a canopy.

In the accompanying drawings, Figure 1 represents a side view of a baby-carriage having a parasol opened and provided with a draping-piece forming a combined canopy and parasol-cover according to our invention, the piece being shown in this view as a canopy. Fig. 2 represents the parasol with the piece shown draped up as a parasol-cover. Fig. 3 is a plan view of the draping-piece drawn to a smaller scale spread out flat. Figs. 4 and 5 are detail views hereinafter explained.

The draping-piece A (shown separately in Fig. 3) is preferably made of net with fairly open mesh and is preferably finished with a ruffle or fullness of lace around the edge. This piece A may be of any desired outline; but we have found a rounded oblong best suited for the ordinary baby-carriage. A hole $a$ is made in the piece A to pass over the projecting top of the stick or its knob $b$ of a baby-carriage parasol B, the hole being placed in such a position that when the piece A is let down it will pass below the top of the carriage-body all around, as shown in Fig. 1, to act as an efficient mosquito-net canopy to protect a child in the carriage from flying insects. Preferably the material around the hole $a$ is reinforced by a stronger piece of material $a'$.

At intervals around the draping-piece A, at or near its outer edge and on either the upper or the under side, as desired, we secure devices, such as hooks $a^2$, for a purpose hereinafter explained.

After the draping-piece has been placed on the parasol a ring C is either passed over the knob $b$ or secured at the top of the parasol by screwing the knob down upon it, Fig. 5, or in any other suitable way. The ring C is provided with eyes $c$ equal in number to the hooks $a^2$ on the draping-piece A. When the draping-piece is not required as a canopy, the hooks $a^2$ are hooked into the eyes $c$, which loops up the canopy, as shown in Fig. 2, the ruffle or lace edge between the hooked-up points falling in a series of jabots radially around the parasol. This forms a dressy ornamental cover for the parasol. It will be evident that only a moment's work will be needed to change the cover to a canopy or the canopy to the cover.

We do not limit our invention to the special form of ring C with eyes $c$ and hooks $a^2$, as any other suitable devices for holding the draping-piece looped up may be used without departing from our invention.

If it be desired to hide the ring C, (and hooks $a^2$ when the piece is looped,) ribbon-loops D may be tied or otherwise fastened around the knob $b$ above the ring C.

The draping-piece A may be secured to the parasol in any desired manner that will permit of its being readily and easily changed from a canopy to a parasol-cover, and vice versa; but with the arrangement shown the piece A can be easily removed and replaced when it is desired to have it cleaned or washed. We do not limit ourselves to the material described, although we prefer netting for the main body of the piece A to permit a freer circulation of air through the open meshes when the draping-piece is used for a canopy.

We claim as our invention—

1. A combined canopy and parasol-cover for baby-carriages, comprising a draping-piece adapted to be held on the carriage-parasol and pass down below the top of the carriage-body, for a canopy, and devices for fastening different points of the outer part of the piece at the top of the parasol, whereby the intermediate portions fall in a series of jabots as an ornamental parasol-cover.

2. A combined canopy and parasol-cover for baby-carriages, comprising a draping-piece adapted to be held on the carriage-parasol and pass down below the top of the carriage-body, for a canopy, said piece being provided with hooks at intervals around its outer edge, and a device at the top of the parasol provided with eyes to be engaged by the hooks on the draping-piece when used as a parasol-cover.

In testimony whereof we have signed our names to this specification in the presence of two subscribing witnesses.

LUCY A. HASSEMER.
LILLIAN H. MENDELL

Witnesses:
M. B. MENDELL,
EDITH J. GRISWOLD.